(12) United States Patent
Tustin et al.

(10) Patent No.: US 10,193,375 B2
(45) Date of Patent: Jan. 29, 2019

(54) CLOSED LOOP CURRENT CONTROL IN A WIRELESS POWER SYSTEM

(71) Applicant: MediaTek Inc., Hsin-Chu (TW)

(72) Inventors: Philip Frank Tustin, North Andover, MA (US); William Plumb, Charlestown, MA (US); Patrick Stanley Riehl, Lynnfield, MA (US)

(73) Assignee: MediaTek Inc., Hsin-Chu (TW)

( * ) Notice: Subject to any disclaimer, the term of this patent is extended or adjusted under 35 U.S.C. 154(b) by 64 days.

(21) Appl. No.: 15/346,273

(22) Filed: Nov. 8, 2016

(65) Prior Publication Data

US 2017/0222469 A1   Aug. 3, 2017

Related U.S. Application Data

(60) Provisional application No. 62/287,931, filed on Jan. 28, 2016.

(51) Int. Cl.
| | | |
|---|---|---|
| *H02J 7/02* | (2016.01) | |
| *H02J 50/12* | (2016.01) | |
| *H02J 50/40* | (2016.01) | |
| *H02J 50/80* | (2016.01) | |

(52) U.S. Cl.
CPC ............ *H02J 7/025* (2013.01); *H02J 50/12* (2016.02); *H02J 50/40* (2016.02); *H02J 50/80* (2016.02)

(58) Field of Classification Search
CPC .. H02J 7/025; H02J 50/12; H02J 50/40; H02J 50/80
USPC ......... 320/108; 307/104; 455/41.1, 572, 573
See application file for complete search history.

(56) References Cited

U.S. PATENT DOCUMENTS

| | | | | |
|---|---|---|---|---|
| 5,561,419 A | * | 10/1996 | Sasaki ............... | A63F 13/06 340/2.1 |
| 7,689,095 B2 | * | 3/2010 | Sugiyama ............ | H04N 5/775 348/734 |
| 8,129,864 B2 | * | 3/2012 | Baarman ............. | H02J 5/005 307/104 |
| 8,841,903 B2 | * | 9/2014 | Lyon .................. | G01V 3/104 324/228 |
| 8,873,457 B2 | * | 10/2014 | Perraud .............. | H04W 52/146 370/318 |
| 9,118,357 B2 | * | 8/2015 | Tseng ................. | H04B 5/0037 |
| 9,124,122 B2 | * | 9/2015 | Kim .................... | H02J 5/005 |
| 9,438,064 B2 | * | 9/2016 | Keeling ............... | H02J 50/80 |
| 9,473,209 B2 | * | 10/2016 | Cooper ................ | H02J 5/005 |
| 9,674,916 B2 | * | 6/2017 | Hashimoto ......... | H05B 33/0854 |
| 9,853,648 B2 | * | 12/2017 | Su ....................... | H03L 7/099 |
| 9,866,073 B2 | * | 1/2018 | Joye .................... | H04B 5/0037 |
| 2006/0172802 A1 | * | 8/2006 | Hussaini .............. | A63F 13/235 463/39 |
| 2007/0007821 A1 | * | 1/2007 | Rossetti .............. | H02J 17/00 307/22 |
| 2007/0008168 A1 | * | 1/2007 | Liao .................... | G08C 17/02 340/12.22 |

(Continued)

*Primary Examiner* — M Baye Diao
(74) *Attorney, Agent, or Firm* — Wolf, Greenfield & Sacks, P.C.

(57) ABSTRACT

Methods and apparatus for providing closed loop current control in a wireless power transmitter. The method comprises adjusting a transmitter coil current generated by the wireless power transmitter based, at least in part, on first feedback reported by at least one wireless power receiver and second feedback based on a measurement of the transmitter coil current.

20 Claims, 6 Drawing Sheets

(56) References Cited

U.S. PATENT DOCUMENTS

| | | | | |
|---|---|---|---|---|
| 2012/0293007 | A1* | 11/2012 | Byun | H02J 17/00 |
| | | | | 307/104 |
| 2015/0091523 | A1* | 4/2015 | Satyamoorthy | H02J 7/025 |
| | | | | 320/108 |
| 2015/0093989 | A1* | 4/2015 | Plumb | H02J 5/005 |
| | | | | 455/41.1 |
| 2016/0072309 | A1* | 3/2016 | Chu | H02J 50/12 |
| | | | | 307/104 |
| 2017/0019971 | A1* | 1/2017 | Hashimoto | H05B 33/0854 |
| 2017/0085113 | A1* | 3/2017 | Yang | H02J 7/025 |
| 2017/0093222 | A1* | 3/2017 | Joye | H04B 5/0037 |
| 2017/0237296 | A1* | 8/2017 | Keith | H02J 50/12 |
| | | | | 307/104 |

* cited by examiner

CLOSED LOOP CURRENT CONTROL IN A WIRELESS POWER SYSTEM

CROSS REFERENCE TO RELATED APPLICATIONS

This application claims priority to U.S. Provisional Application Ser. No. 62/287,931, titled "Method for Closed Loop Current Control During Operation of a Wireless Power System," filed Jan. 28, 2016, which is hereby incorporated by reference in its entirety.

BACKGROUND

A wireless power system employs a pair of inductive coils forming a loosely-coupled transformer to transfer power wirelessly. Power is transferred through the system more efficiently by using impedance-matching networks, which cancel the reactive impedance of the inductive coils. In the ideal case with a resistive load, the matching networks can be tuned perfectly to cancel all reactive impedance, creating a perfectly matched circuit. In practice, the load power varies according to the demands of the device or devices being serviced, resulting in a varying load impedance. The coupling factor between the transmitter and receiver coils changes with the relative position of the charger and the charging device.

FIG. 1 illustrates a wireless power system that includes a wireless power transmitter 2 and a wireless power receiver 3. The wireless power transmitter 2 receives a fixed voltage from a DC adapter. The fixed adapter voltage is scaled by a DC/DC converter 4 and applied to an inverter 6. The inverter, in conjunction with transmitter matching network 8, generates an AC current in transmit coil 10. The AC current in the transmit coil 10 generates an oscillating magnetic field in accordance with Ampere's law. The oscillating magnetic field induces an AC voltage into the tuned receiver coil 12 of wireless power receiver 3 in accordance with Faraday's law. The AC voltage induced in the receiver coil 12 is applied to a rectifier 16 that generates an unregulated DC voltage. The unregulated DC voltage is regulated using a DC/DC converter 18, which is filtered and provided to a load, such as a battery charger of an electronic device.

SUMMARY

Some embodiments relate to a wireless power transmitter. The wireless power transmitter comprises a first controller configured to set a target coil current value based, at least in part, on a voltage value reported by a wireless power receiver, an amplifier configured to generate a transmitter coil current based, at least in part, on a supply voltage received by the amplifier, and a second controller configured to adjust the supply voltage received by the amplifier based, at least in part, on a comparison of a value of the transmitter coil current to the target coil current value.

Some embodiments are directed to a wireless charging system. The wireless charging system comprises a wireless charging pad including a wireless charging transmitter formed therein and at least one wireless power receiver coupled to the wireless charging transmitter. The wireless charging transmitter includes at least one controller configured to adjust a transmitter coil current generated by the wireless charging transmitter based, at least in part, on first feedback reported by the at least one wireless power receiver and second feedback based on a measurement of the transmitter coil current.

Some embodiments are directed to a method of providing closed loop current control in a wireless power transmitter. The method comprises adjusting a transmitter coil current generated by the wireless power transmitter based, at least in part, on first feedback reported by at least one wireless power receiver and second feedback based on a measurement of the transmitter coil current.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Varying load conditions in a wireless power system result in fluctuations to the power requirements of the wireless power transmitter. For example, in a multi-device charging scenario, the addition of a new wireless charging receiver in the charging area results in a change to the load impedance. In response to a detected change in load impedance, the wireless power transmitter adjusts its coil current to provide additional power for charging the newly added device. In the scenario outlined above, the transmitter adjusts its coil current in an expected way to meet the power demands of the receivers being charged. The coil current in a wireless power transmitter may also fluctuate for undesired reasons such as temperature drift, dynamic loading, or movement of the receivers within the charging area.

Providing a constant transmitter coil current is important for wireless power systems that have varying power requirements. Some embodiments are directed to techniques for controlling the current of a wireless power transmitter coil to a constant value that changes when a controller in the transmitter determines that a change is necessary. Providing transmitter coil current control further enables the current to be held constant at any desired value rather than relying on feedback from one or more wireless power receivers coupled to the transmitter. Holding the transmitter coil constant is also important for some applications, such as testing, as discussed in more detail below.

Figure 1:
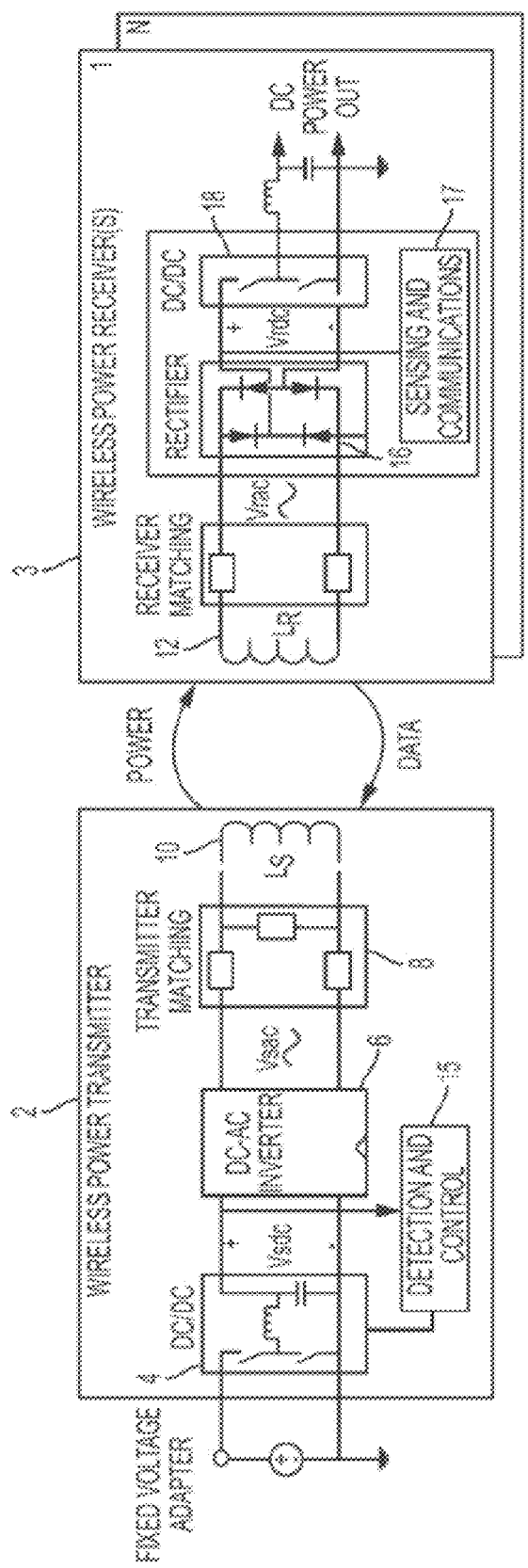
FIG. 1 schematically shows a wireless power system within which closed loop current control may be implemented in accordance with some embodiments.

Wireless power specifications such as Qi, PMA, and AirFuel require that the power transmitter in a wireless power system have some form of closed loop control to ensure that power is provided to charging devices in a safe and stable manner. Some conventional wireless power systems implement a single control feedback loop that adjusts the voltage supplied to the DC/DC converter in the wireless power transmitter based on a sensed rectified voltage (Vrect) provided to the wireless power transmitter from a wireless power receiver. An example of a single loop feedback architecture for a wireless power system is illustrated in FIG. 1, described briefly above. The wireless power transmitter 2 uses a closed loop power control scheme. The power control scheme allows individual device power needs to be met while providing high efficiency and safe receiver operation. The sensing and communications circuit 17 of the wireless power receiver senses the power demands of the load by measuring the voltage and/or current at the input of the DC/DC converter 18. Receiver power is fed back to the wireless power transmitter 2 using a communication channel, shown as the arrow labeled "Data" in FIG. 1. The sensing and communications circuit 17 sends data regarding the power demands of the receiver to the wireless power transmitter 2. A detection and control circuit 15 of the wireless power transmitter 2 detects the signal from the wireless power receiver 3 and adjusts the output voltage of the DC/DC converter 4 in order to satisfy the power requirements of the wireless power receiver 3. Fluctuations in the rectified voltage (Vrect) sensed at a receiver may be caused by one or more factors including, but not limited to movement of the receiver relative to the transmitter, temperature variations of the transmitter, and temperature variations of the receiver.

Figure 2:
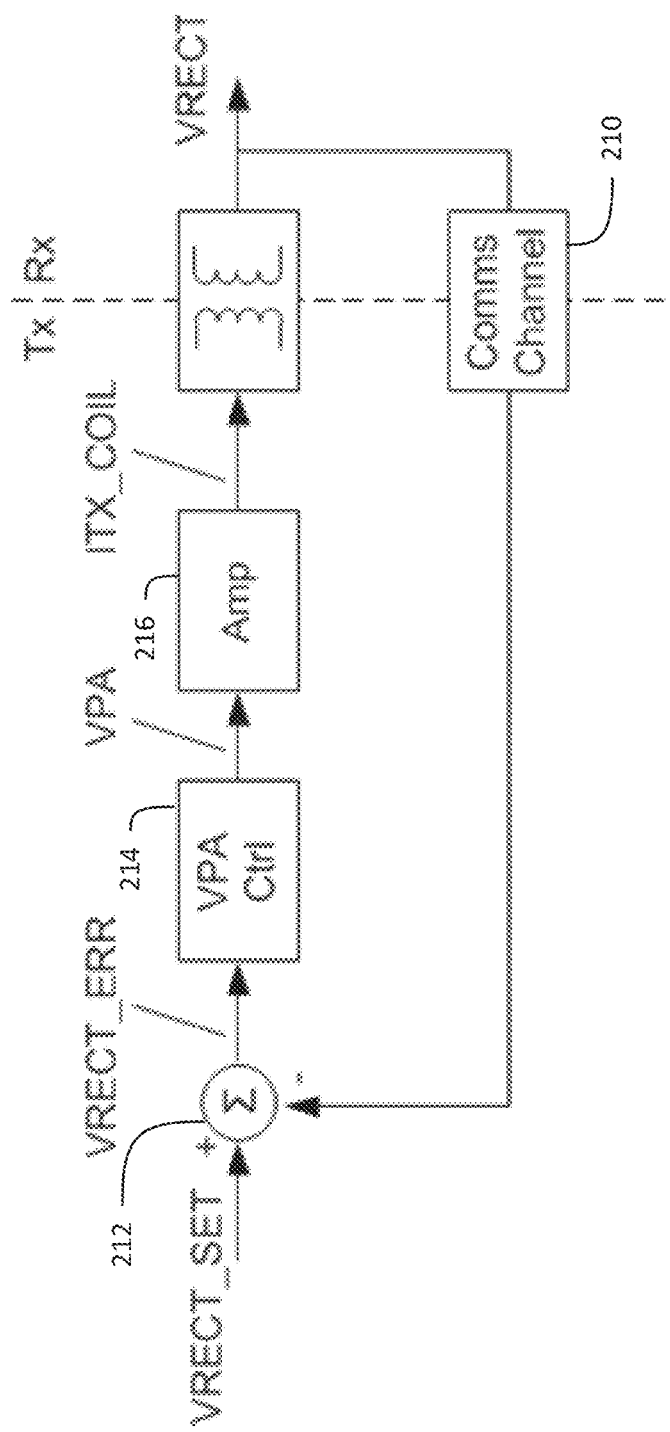
FIG. 2 shows a block diagram of a wireless power system that includes a single feedback loop architecture for controlling the transmitter coil current.

FIG. 2 schematically illustrates another example of a wireless power transmitter that controls the transmitter coil current (Itx_coil) based on feedback reported by a coupled wireless power receiver via communications channel 210. The goal of the feedback loop is to force the receiver voltage (Vrect) equal to a setpoint voltage (Vrect_set) by reducing the voltage error (Vrect_err) defined as the difference between Vrect and Vrect_set. To facilitate this goal, the wireless power transmitter includes a comparison element 212, which compares the rectified voltage Vrect signal reported by the wireless power receiver to the target setpoint voltage Vrect_set. Controller 214 is configured to adjust the supply voltage provided to amplifier 216 based on the voltage error Vrect_err. Amplifier 216 generates a transmitter coil current Itx_coil that at least partially compensates for Vrect_err.

Figure 3:
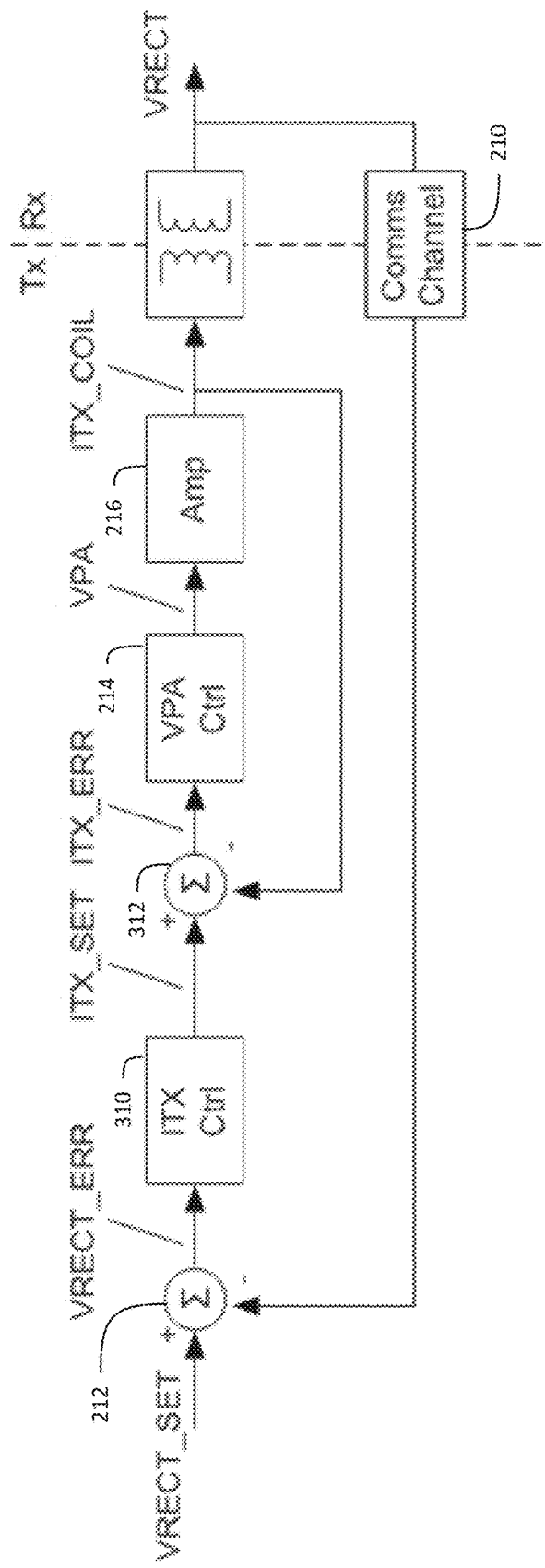
FIG. 3 shows a block diagram of a wireless power system that includes a dual feedback loop architecture for controlling the transmitter coil current in accordance with some embodiments.

The inventors have recognized and appreciated that wireless power systems with a single feedback control loop based on information reported by the receiver circuitry to the transmitter circuitry over a communication channel as shown in FIGS. 1 and 2 may be improved by providing a second "inner" feedback control loop implemented within the wireless power transmitter circuitry. The inner feedback control loop is configured to maintain a quasi-constant current in the transmitter coil though frequent updates to the control parameters of the transmitter circuitry. FIG. 3 schematically illustrates an example of a wireless power transmitter that receives feedback reported by a wireless power receiver in an outer feedback control loop and that monitors transmitter coil current at the transmitter using an inner feedback control loop.

The inner feedback control loop of FIG. 3 includes a current sensor (e.g., a current sense transformer) that senses the transmitter coil current (Itx_coil) and transforms the sensed current measurement into a signal that is provided to comparison element 312. Comparison element 312 compares the sensed current signal to a transmitter coil current setpoint value (Itx_set) to determine fluctuations in the transmitter coil current as a current error value (Itx_err). The output of comparison element 312 is provided to controller 214, which is configured to adjust the supply voltage (Vpa) provided to amplifier 216 based on the current error value Itx_err.

The dual loop control architecture shown in FIG. 3 allows more precise control over Itx_coil than is possible using the conventional single feedback control loop architecture shown in FIG. 2. In particular, the dual loop control architecture allows changes in Itx_coil to be separated into changes driven by voltage errors (Vrect_err) reported by receivers in an outer feedback control loop and changes in the transmitter coil current driven by temperature variations as sensed by the inner feedback control loop.

Controller 310 in the outer control loop of the dual feedback loop architecture of FIG. 3 establishes the target transmitter coil current setpoint Itx_set. The rectified voltage error Vrect_err determined by comparison element 212 is transformed into a value ΔItx, which is an estimate of the change in transmitter coil current caused by Vrect_err. Itx_set(t+1) is then determined by controller 310 using the most recent Itx setpoint value Itx_set(t) and the latest ΔItx value.

Controller 214 in the inner feedback control loop is configured to determine a supply voltage Vpa to provide to amplifier 216 based on an Itx_err output from comparison element 312. Comparison element 312 is configured to compare the transmitter target current setpoint value Itx_set established in the outer feedback loop to the sensed transmitter coil current Itx_coil to generate the value Itx_err. Accordingly, in a dual loop control architecture in accordance with some embodiments, the inner control loop adjusts Itx_coil based on errors in Itx_coil, whereas the outer control loop adjusts Itx_coil based on errors in Vrect.

Wireless charging specifications typically identify high-level control objectives for a wireless power system. For example, some objectives may include: (1) protect the receiver Vrect from overvoltage (Vrect>Vrect_max); (2) reduce the receiver Vrect such that Vrect≤Vrect_max within five seconds after a receiver reports its Vrect>Vrect_max; (3) ensure that all receivers are provided with Vrect_min<Vrect<Vrect_max if objectives (1) and (2) are satisfied; and (4) control Itx_coil if objectives (1), (2), and (3) are satisfied to either minimize Vrect_err or maximize total system efficiency.

Some embodiments are configured to control a transmitter coil current (Itx_coil) to satisfy at least some of the control objectives of a wireless power specification by implementing minimum and maximum current limits and by regulating the step size for transmitter coil current. For example, controller 310 may be configured to set minimum and/or maximum limits on the current setpoint value to facilitate meeting the first and third objectives described above. Controller 310 may also be configured to set the maximum step size limits for adjusting the transmitter coil current to ensure that the transmitter coil current transitions smoothly between power levels when more power is needed due to varying load impedances.

The dual loop feedback control architecture described herein also facilitates meeting the second objective to quickly reduce Vrect when it is determined that Vrect>Vrect_max. Feedback using communications channel 210 is typically transmitted to the transmitter control circuitry on the order of a few updates per second, whereas updates using the inner control loop implemented entirely on the transmitter may occur at least an order of magnitude faster (e.g., 20-50 times per second). Monitoring and updating the transmitter coil current more frequently via the inner feedback control loop provides tighter control over the coil current by, for example, responding to temperature drifts, which is not achievable with the slower update rates in the outer feedback loop.

Figure 4:
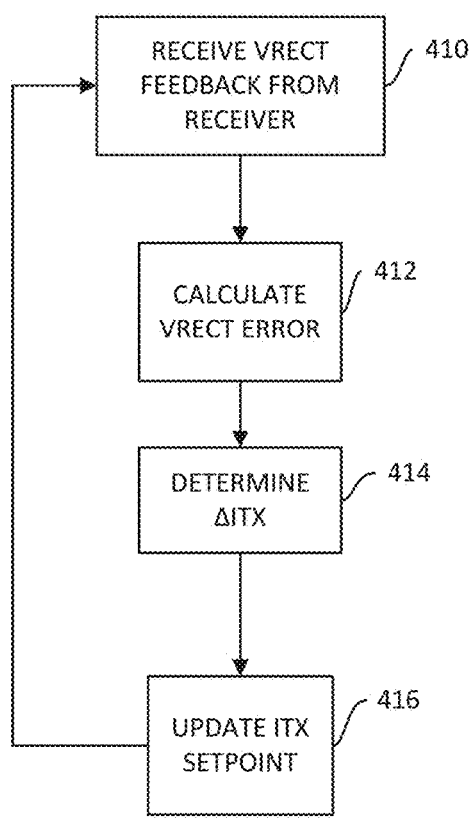
FIG. 4 shows a flowchart of a process for setting a current setpoint based on feedback received from a wireless power receiver in accordance with some embodiments.

FIG. 4 shows a process for updating a target transmitter coil current setpoint in an outer control loop of a dual loop feedback control architecture in accordance with some embodiments. In act 410, rectified voltage feedback (Vrect) is reported to the wireless transmitter circuitry by the wireless receiver circuitry via a communications link. The process then proceeds to act 412, where the Vrect value is compared to a voltage setpoint (Vrect_set) to determine a difference between Vrect and Vrect_set, defined herein as the quantity Vrect_err. The process then proceeds to act 414, where a change in the transmitter coil current setpoint (ΔItx) is determined. In some embodiments, ΔItx is directly from Vrect_err by using a proportional relationship such as ΔItx=m*Vrect_err, where m is determined using an offline calibration process. The process then proceeds to act 416, where the value of ΔItx is used to update the Itx setpoint value. The process then returns to act 410, where additional Vrect feedback is received from the wireless receiver circuitry and the process repeats.

Figure 5:
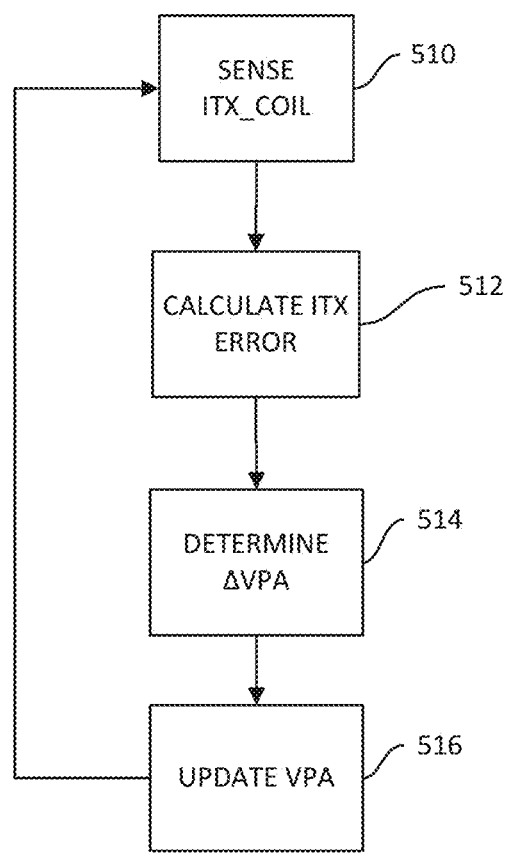
FIG. 5 shows a flowchart of a process for updating a supply voltage for a power converter in a wireless power transmitter based on a measurement of the transmitter coil current in accordance with some embodiments.

FIG. 5 shows a process for updating a supply voltage (Vpa) for an amplifier of a wireless transmitter in an inner control loop of a dual loop feedback control architecture in accordance with some embodiments. In act 510, the transmitter coil current (Itx_coil) is sensed using, for example, a current sense transformer. The current sense transformer may be configured to sense the transmitter coil current, rectify the sensed current, and transform the rectified current into a signal that can be compared to a reference current signal. The process then proceeds to act 512, where a current error (Itx_err) is determined based on the sensed current value (Itx_coil) and a transmitter coil current setpoint (Itx_set) set by the outer control loop of the dual loop feedback control architecture, as discussed above. The process then proceeds to act 514, where control circuitry of the inner control loop determines an appropriate amount to adjust the supply voltage (Vpa) based on the calculated Itx_err value. The process then proceeds to act 516, where the supply voltage Vpa is updated, and the process returns to act 510, where a new reading of the transmitter coil current is acquired and the process repeats.

Figure 6:
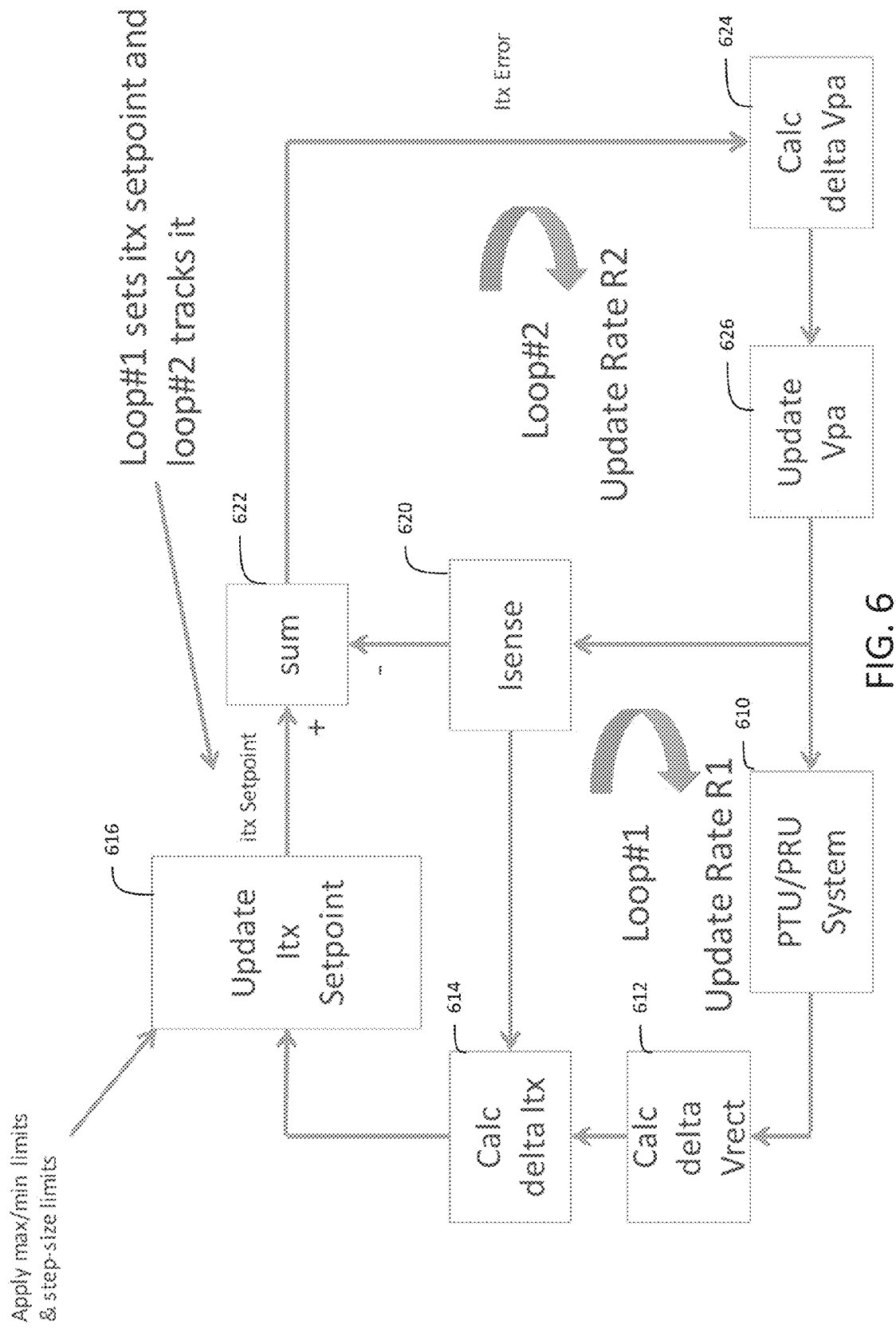
FIG. 6 shows a flowchart of a process for implementing a dual feedback loop architecture for controlling a transmitter coil current in a wireless power system in accordance with some embodiments.

FIG. 6 shows a block diagram illustrating a process for updating values in a dual loop feedback architecture for a wireless power system in accordance with some embodiments. In particular, FIG. 6 shows an example of a way in which the outer control loop (identified as loop #1 in FIG. 6) and the inner control loop (identified as loop #2 in FIG. 6) may be implemented to work together to adjust the transmitter coil current Itx_coil. As shown, the outer control loop sets the target current setpoint (Itx_set) at a first update rate R1, while the inner control loop tracks changes to the coil current (Itx_coil) at the transmitter and updates the supply voltage Vpa at a second update rate R2 faster than the update rate R1. The outer control loop determines how to modify the supply voltage Vpa based on feedback of the receiver rectifier voltage Vrect, whereas the inner control loop monitors the transmitter coil value to ensure that a quasi-constant transmitter coil current is maintained.

Regarding the outer control loop, in act 610, feedback is reported by the wireless power receiver circuitry indicating a value for the receiver rectifier voltage Vrect. The outer control loop process proceeds to act 612, where the Vrect_err value (identified as "delta Vrect" in FIG. 6) is calculated. The outer control loop process proceeds to act 614, where ΔItx is calculated from Vrect_err. The outer control loop process then proceeds to act 616, where the current target setpoint value Itx_set is updated based on the calculated value of ΔItx.

Other factors may also be taken into consideration when setting the target current setpoint value Itx_set, examples of which are shown in FIG. 6. For example, the control circuitry in the outer control loop may be configured to apply minimum and/or maximum limits on the transmitter coil current, which may facilitate compliance with operating condition requirements of some wireless power specifications. In some embodiments, step size limits for adjusting the transmitter coil current may also be applied to the process of updating the Itx_set value. For example, in one implementation, the step size may be limited to be no larger than 5% of the current Itx_set value.

The inner control loop of FIG. 6 is configured to monitor the coil current (Itx_coil) and provide feedback to adjust transmitter control circuitry parameters. The inner control loop ensures that a constant coil current is provided using a faster update rate than provided by the outer control loop. In act 620, the transmitter coil current is sensed and provided to a comparison element, which is configured to compare the sensed current with the target Itx_set value established by the outer control loop. As shown, the sensed current may also be sent to a controller of the outer control loop for calculating ΔItx. Although FIG. 6 shows the sensed coil current value as being sent to the outer loop controller, it should be appreciated that in some embodiments, sensed coil current values may be stored in a memory accessible to the outer loop controller, and the outer loop controller may access the most up-to-date sensed coil current value at any time, when needed.

After sensing the transmitter coil current Itx_coil, the inner control loop process proceeds to act 622, where the sensed current is compared to the Itx_set value set by the outer control loop process described above. The comparison element is shown as a summing element to determine the difference between the Itx_set value and the sensed current value Itx_coil, though it should be appreciated that any suitable comparison element(s) may alternatively be used. The difference between the sensed current value Itx_coil and the Itx_set value, referred to as the Itx_err value herein, is used in act 624 by the controller of the inner control loop to determine an amount to adjust the supply voltage Vpa provided to the amplifier of the wireless power transmitter. The inner control loop process then proceeds to act 626, where the inner loop controller updates the supply voltage Vpa, and the inner control loop continues to monitor and update the coil current Itx_coil using a new coil current source measurement.

As discussed above, the dual control loop architecture for a wireless power system in accordance with some embodiments provides some advantages compared to some conventional wireless power systems that include a single feedback loop that provides information from the receivers in the system to the wireless power transmitter. For example, the dual loop control architecture allows for limits to be set on the transmitter coil current, which facilities compliance with wireless power transfer specifications. Additionally, measurements and compensation of the coil current using circuitry implemented in the transmitter circuitry may allow for more precise control of the coil current compared to the single loop feedback control architecture in which the coil current is estimated based on the rectified voltage feedback Vrect reported by the wireless power receiver.

Due to the relatively slow update rate provided in a single feedback loop control architecture, temperature variations at the transmitter or the receiver cause fluctuations in the transmitter coil current that are not well controlled. By implementing a current control loop that measures the transmitter coil current and provides a fast update rate, a quasi-constant transmitter coil current may be maintained.

Some wireless power specifications place design requirements on the current control loop in a wireless power system to be able to perform system-wide tests to ensure safe operation of the wireless power system. In one such test, instead of a receiver being placed on the charging pad including the transmitter, the receiver is externally powered and a current load is applied directly to the resonator output of the transmitter rather than the receiver itself providing the current load. This test requires that the value of the transmitter coil current be kept within +/−5% of its starting value. However, as discussed above, the transmitter coil current may drift due to temperature variations in the transmitter and in the test load itself. The inner control current loop employed in accordance with some embodiments may facilitate performance of this test by at least partially correcting for the effects of temperature variations on the transmitter coil current value even when a rectified voltage Vrect value is not reported by a coupled receiver.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A wireless power transmitter, comprising:
   a first controller configured to set a target coil current value based, at least in part, on a voltage value reported by a wireless power receiver;
   an amplifier configured to generate a transmitter coil current based, at least in part, on a supply voltage received by the amplifier; and
   a second controller configured to adjust the supply voltage received by the amplifier based, at least in part, on a comparison of a value of the transmitter coil current to the target coil current value.

2. The wireless power transmitter of claim 1, wherein the first controller is configured to set the target coil current value at a first update rate, wherein the second controller is configured to adjust the supply voltage at a second update rate, and wherein the second update rate is faster than the first update rate.

3. The wireless power transmitter of claim 1, further comprising a current sense transformer coupled to the second controller, wherein the current sense transformer is configured to measure the value of the transmitter coil current.

4. The wireless power transmitter of claim 3, wherein the current sense transformer is coupled to the second controller via a comparison element.

5. The wireless power transmitter of claim 4, wherein the comparison element is configured to:
   compare the value of the transmitter coil current measured by the current sense transformer to the target coil current value set by the first controller; and
   provide a current error value to the second controller based on the comparison.

6. The wireless power transmitter of claim 1, wherein the first controller is further configured to set the target coil current value based on a voltage error value received from a comparison element.

7. The wireless power transmitter of claim 6, wherein the comparison element is configured to:
   compare the voltage value reported by the wireless power receiver to a set voltage value to determine the voltage error value; and
   provide the voltage error value to the first controller.

8. The wireless power transmitter of claim 1, wherein the first controller is further configured to set the target coil current value based on one or more of a minimum transmitter coil current value, a maximum transmitter coil current value, and a step size limit for the transmitter coil current.

9. The wireless power transmitter of claim 1, wherein the second controller is configured to control the value of the transmitter coil current to within +/−5% of the set target coil current value.

10. The wireless power transmitter of claim 1, further comprising a comparison element coupled to the first controller and the second controller, wherein the comparison element is configured to output a current error value to the second controller based, at least in part, on the comparison of the transmitter coil current to the target coil current.

11. The wireless power transmitter of claim 1, wherein the voltage value reported by the wireless power receiver comprises a rectified voltage measurement.

12. A wireless charging system, comprising:
   a wireless charging pad including a wireless charging transmitter formed therein; and
   at least one wireless power receiver configured to be coupled to the wireless charging transmitter when placed on the wireless charging pad;
   wherein the wireless charging transmitter includes:
      a current sense transformer configured to measure a value of the transmitter coil current generated by the wireless power transmitter; and
      at least one controller coupled to the current sense transformer via a comparison element configured to generate a current error value based on a comparison of the value of the transmitter coil current measured by the current sense transformer and a set target coil current value determined based on first feedback reported by the at least one wireless power receiver,
      wherein the at least one controller is configured to adjust a transmitter coil current generated by the wireless charging transmitter based, at least in part, on the current error value.

13. The wireless charging system of claim 12, wherein the at least one controller includes a first controller configured to set the target coil current value based, at least in part on the first feedback and a second controller configured to adjust a supply voltage provided to an amplifier in the wireless power transmitter based, at least in part, on the current error value.

14. The wireless charging system of claim 12, further comprising a communications channel coupled between the wireless charging transmitter and the at least one wireless power receiver, wherein the first feedback is provided from the at least one wireless power receiver to the wireless charging transmitter via the communications channel.

15. The wireless charging system of claim 12, wherein the at least one controller is configured to control a value of the transmitter coil current to within +/−5% of the set target coil current value.

16. A method of providing closed loop current control in a wireless power transmitter, the method comprising:
measuring a value of a transmitter coil current generated by the wireless power transmitter;
generating a current error value based on a comparison of the value of the transmitter coil current and a set target coil current value determined based on first feedback reported by at least one wireless power receiver; and
adjusting the transmitter coil current generated by the wireless power transmitter based, at least in part, on the current error value.

17. The method of claim 16, further comprising:
setting the target coil current value based, at least in part on the first feedback reported by the at least one wireless power receiver; and
comparing the set target coil current value to the measurement of the transmitter coil current.

18. The method of claim 17, wherein adjusting the transmitter coil current comprises controlling the value of the transmitter coil current to within +/−5% of the set target coil current value.

19. The method of claim 16, wherein adjusting the transmitter coil current comprises adjusting a supply voltage provided to an amplifier configured to generate the transmitter coil current.

20. A method of providing closed loop current control in a wireless power transmitter, the method comprising:
setting a target coil current value based, at least in part, on a rectified voltage error between a rectified voltage value reported by a wireless power receiver and a set voltage value;
generating a supply voltage based, at least in part, on a current error between a measured value of a transmitter coil current and the set target coil current value; and
providing the supply voltage to an amplifier to generate an adjusted transmitter coil current.

* * * * *